(12) United States Patent
Bechmann et al.

(10) Patent No.: US 8,297,132 B2
(45) Date of Patent: Oct. 30, 2012

(54) DEVICE FOR RECOGNIZING A MECHANICAL DEFECT IN A WIRE OF AN OVERHEAD LINE

(75) Inventors: Jürgen Bechmann, Mühlhausen (DE); Andre Dölling, Erlangen (DE); Axel Schmieder, Leipzig (DE); Manfred Semrau, Halle (DE)

(73) Assignee: Siemens Aktiengesellschaft, Munich (DE)

( * ) Notice: Subject to any disclaimer, the term of this patent is extended or adjusted under 35 U.S.C. 154(b) by 446 days.

(21) Appl. No.: 12/524,579

(22) PCT Filed: Jan. 7, 2008

(86) PCT No.: PCT/EP2008/050095
§ 371 (c)(1),
(2), (4) Date: Jul. 27, 2009

(87) PCT Pub. No.: WO2008/095739
PCT Pub. Date: Aug. 14, 2008

(65) Prior Publication Data
US 2009/0320615 A1     Dec. 31, 2009

(30) Foreign Application Priority Data
Feb. 6, 2007   (DE) .......................... 10 2007 005 859

(51) Int. Cl.
*G01L 5/04* (2006.01)
(52) U.S. Cl. .................................. 73/862.391
(58) Field of Classification Search .............. 73/862.391
See application file for complete search history.

(56) References Cited

U.S. PATENT DOCUMENTS

| | | | |
|---|---|---|---|
| 3,073,156 A * | 1/1963 | Rowe ....................... | 73/862.391 |
| 4,960,001 A | 10/1990 | Vemmer | |
| 5,251,492 A * | 10/1993 | Nowag ...................... | 73/862.472 |
| 5,725,029 A * | 3/1998 | Loehr et al. ................... | 139/453 |
| 6,419,180 B1 * | 7/2002 | Gmeiner ..................... | 242/420.6 |

FOREIGN PATENT DOCUMENTS

| | | |
|---|---|---|
| DE | 1912255 U | 3/1965 |
| DE | 112172 A1 | 3/1975 |
| DE | 2727228 A1 | 12/1978 |
| DE | 210975 A | 6/1984 |
| DE | 3708749 C1 | 7/1988 |
| DE | 4308924 A1 | 9/1993 |
| DE | 29713425 U1 | 9/1997 |
| DE | 19854369 A1 | 11/1999 |
| DE | 10345508 A1 | 10/2005 |
| DE | 102004020440 B3 | 1/2006 |
| DE | 102006007063 A1 | 8/2007 |
| JP | 63305262 A | 12/1988 |
| JP | 7023628 A | 1/1995 |
| JP | 8216739 A | 8/1996 |
| JP | 9109737 A | 4/1997 |
| JP | 9288023 A | 11/1997 |
| JP | 11208320 A | 8/1999 |
| JP | 2003348723 A | 12/2003 |

OTHER PUBLICATIONS

International Search Report dated Jan. 27, 2009.

* cited by examiner

*Primary Examiner* — Lisa Caputo
*Assistant Examiner* — Octavia Davis-Hollington
(74) *Attorney, Agent, or Firm* — Laurence A. Greenberg; Werner H. Stemer; Ralph E. Locher

(57) ABSTRACT

A device for recognizing a mechanical defect in a wire of an overhead line. A device for determining the tension in the wire is connected to the wire and a support. The device is connected to an analytical device for comparing the tension with a set value and for indicating a mechanical defect when the value drops below the set value.

9 Claims, No Drawings

DEVICE FOR RECOGNIZING A MECHANICAL DEFECT IN A WIRE OF AN OVERHEAD LINE

BACKGROUND OF THE INVENTION

Field of the Invention

The invention relates to an apparatus for recognition of a mechanical defect in a wire of an overhead line.

This overhead line is used in particular for railroad operation and may also be in the form of an overhead line chain mechanism. The wire may be both the traction wire and the supporting cable.

When a live electrical line comes into contact with a grounded component, a grounded line of an overhead line chain mechanism or a return line to a substation, for example because it is cracked, the power supply to the overhead line must be switched off in order that it is not possible for personnel to be endangered.

Until now, it has been normal practice to use a suitable apparatus to detect a short-circuit current in order to switch off the power supply, for example in a substation, when an excessively high short-circuit current occurs. An apparatus such as this does not always operate sufficiently reliably, as a result of which the power supply is sometimes not switched off even though an excessively high current is run through grounded components and lines. Personnel are therefore at risk. This is the case in particular when an overhead line which has not been switched off is torn off by a train pickup. Particularly in a tunnel, this can lead to a fire. It is also possible for the power supply to be reconnected too quickly after a short circuit, which likewise endangers personnel.

A wire of an overhead line chain mechanism, for example a traction wire or a supporting cable, has a specific length. In order to allow smooth railroad operation, the wires overlap at their end.

A wire is rigidly attached to a first supporting point via an insulator. However, at its other end, it is connected to a second supporting point via a retensioning device. One such retensioning device is known, for example, from DE 297 13 425 U1. This retensioning device comprises a tensioning wheel which is attached via a moving rocker to a supporting point, which, for example, is a mast. The wire to be tensioned ends at the tensioning wheel. In order to ensure the desired stress in the wire, a torque acts on the tensioning wheel. The torque is caused by a cable which originates from the circumference of the tensioning wheel and is drawn downward by a weight body.

BRIEF SUMMARY OF THE INVENTION

The invention is based on the object of specifying an apparatus for recognition of a mechanical defect in a wire of an overhead line, which apparatus provides a reliable indication of a defect before the wire breaks and electrically live components and lines come into contact with grounded components and lines, which is dangerous for personnel.

According to the invention, the object is achieved in that a device for determining the tensile force in the wire is connected to the wire and to a supporting point and in that the device is connected to an evaluation device for comparison of the tensile force with a nominal value and for indication of a mechanical defect if the nominal value is undershot.

The expression tensile force means that force with which the stressed wire pulls on the supporting point. By way of example, the supporting point is a mast. The wire can end directly at the supporting point or at a component which is mechanically connected to the supporting point.

The apparatus according to the invention results in the advantage that a defect is recognized not just when a wire is cracked or even when an electrically live wire comes into contact with a grounded wire, but that even mechanical damage to the wire, which initially cannot be recognized directly, can be detected. The defect may be only a relatively small crack in the wire, although this already affects the tensile force in the wire. Very small defects in the wire are advantageously detected.

If a defect has been recognized, it can be indicated thus allowing measures to be taken quickly against a possible incipient hazard. For example, after the recognition of a defect, the entire section of the overhead line can be switched off automatically, for example in a substation. This advantageously means that an incipient relatively major defect can be recognized early. Dangers to personnel resulting from live electrical lines, in particular live electrical lines that have been torn off, as a result of a defect are precluded.

DESCRIPTION OF THE INVENTION

By way of example, a force transducer is arranged between the wire and a first supporting point, at which the wire ends, as the device for determining the tensile force in the wire. A force transducer, which can measure forces, is known per se. Said arrangement of the force transducer results in the advantage that the force with which the wire to be monitored pulls on the first supporting point can always be reliably monitored.

By way of example, a force transducer is arranged between the wire and a tensioning wheel, which is held by a second supporting point and at which the wire ends, as the device for determining the tensile force in the wire. This arrangement also achieves the advantage that the force with which the wire to be monitored pulls on the tensioning wheel and therefore indirectly on the second supporting point can be monitored.

It is thus possible to measure and to monitor the tensile force in the wire both at one of its ends and at its other end, thus achieving greater accuracy.

For example, a rotation angle gauge is arranged between a second supporting point and a moving rocker which is fitted to the supporting point and to which a tensioning wheel is fitted, at which the wire ends, as the device for determining the tensile force in the wire, and the rotation angle gauge is connected to an evaluation unit for determining the tensile force in the wire from the measured rotation angle.

This is because there is a functional relationship between the tensile force in the wire and the angle which the moving rocker assumes with the second supporting point which, for example, is a mast.

The position of the rocker relative to the second supporting point is given by the tensile force in the wire and by the weight force of the weight body of the retensioning device. If the tensile force decreases as a result of a defect in the wire, for example as a result of a crack in the wire which has not yet completely destroyed the wire, the weight force at that time predominates, as a result of which the rocker moves downward and assumes a smaller angle with the supporting point, for example with the mast.

This results in the advantage that the tensile force in the wire can be determined simply by determining an angle between two components, with this being an indication as to whether the wire has a defect, for example a crack.

For example, a position gauge is associated with a weight body as the device for determining the tensile force in the wire, which weight body is connected to a tensioning wheel, at which the wire ends. The position gauge is connected to an evaluation unit for determining the tensile force in the wire from the measured position of the weight body.

If the tensile force in the wire decreases as a result of a defect, for example a crack, the force from the wire on the tensioning wheel decreases, as a result of which the weight body moves downward. This change in the position of the weight body is used in an evaluation unit to determine the tensile force in the wire, by means of a given functional relationship.

Both a force transducer and a rotation angle gauge as well as a position gauge are commercially available, known components.

By way of example, the position gauge is an infrared detector which operates in a non-contacting manner and is easy to fit.

For example, at least two different devices for determining the tensile force in the wire are connected to the evaluation device. The evaluation device is used for comparison of the tensile forces with nominal values and for indication of a mechanical defect when at least two tensile forces undershoot the respective nominal value at the same time.

The various embodiments of the apparatus for recognition of a mechanical defect can therefore be used at the same time on one wire. If there are at least two different devices, it is therefore possible that a mechanical defect will be indicated only when at least two devices produce an indication of a defect. This results in the advantage that indications of mechanical defects in the wire resulting from a measurement error are largely precluded. Only when two different measurements, separately from one another, lead to the belief that there is a defect, is a defect such as this also indicated.

All of the embodiments of the apparatus for recognition of a mechanical defect in a wire of an overhead line advantageously allows quick and reliable recognition of a defect in the wire. The various embodiments can also be used at the same time on one wire.

The apparatus for recognition of a mechanical defect in a wire, in particular with each of the embodiments of the apparatus, results in particular in the advantage that even a small crack in the wire can be recognized. A defect can therefore be reliably recognized well before it leads to destruction of the wire. This largely precludes the danger to personnel resulting from electrically live components following a defect.

The invention claimed is:

1. An apparatus for recognizing a mechanical defect in a wire of an overhead line, comprising:
   a device for determining a tensile force in the wire, said device being connected to the wire and to a supporting point;
   an evaluation device connected to receive a signal representing the tensile force in the wire, said evaluation device being configured to compare a value of the tensile force with a nominal value and, if the nominal value is undershot, to indicate a mechanical defect in the wire of the overhead line.

2. The apparatus according to claim 1, wherein said device for determining the tensile force in the wire is a force transducer arranged between the wire and a first supporting point forming a termination of the wire.

3. The apparatus according to claim 1, wherein said device for determining the tensile force in the wire is a force transducer arranged between the wire and a tensioning wheel, wherein the tensioning wheel is held at a second supporting point and the wire ends at the tensioning wheel.

4. The apparatus according to claim 1, wherein said device for determining the tensile force in the wire is a rotation angle gauge arranged between a second supporting point and a moving rocker mounted to said supporting point, wherein a tensioning wheel, at which the wire ends, is mounted to said supporting point, and wherein said rotation angle gauge is connected to an evaluation unit for determining the tensile force in the wire from the measured rotation angle.

5. The apparatus according to claim 1, wherein said device for determining the tensile force in the wire includes a position gauge associated with a weight body for tensioning the wire and connected to a tensioning wheel, at which the wire ends, and wherein said position gauge is connected to an evaluation unit for determining the tensile force in the wire from a measured position of the weight body.

6. The apparatus according to claim 5, wherein said position gauge is an infrared detector configured to operate in a non-contacting manner.

7. The apparatus according to claim 1, wherein said device for determining the tensile force in the wire is one of at least two different devices for determining the tensile force in the wire connected to said evaluation device, and said evaluation device is configured to compare the tensile forces with nominal values and for indication of a mechanical defect when at least two values for the tensile forces undershoot the respective nominal value at the same time.

8. A method for determining a mechanical defect in a wire of an overhead line, comprising:
   providing an apparatus according to claim 1;
   connecting the device for determining a tensile force in the wire to the wire and to the supporting point and measuring the tensile force;
   comparing the tensile force to a nominal value and concluding and indicating a mechanical defect if a value of the tensile force undershoots the nominal value.

9. An apparatus for recognizing a mechanical defect in a wire of an overhead line, comprising:
   a device for determining a tensile force in the wire, said device being connected between an end of the wire and a supporting point of the wire;
   an evaluation device connected to receive a signal representing the tensile force in the wire, said evaluation device being configured to compare a value of the tensile force with a nominal value and, if the nominal value is undershot, to indicate a mechanical defect in the wire of the overhead line.

* * * * *